(12) United States Patent
Chun

(10) Patent No.: US 9,801,230 B2
(45) Date of Patent: Oct. 24, 2017

(54) METHOD AND SYSTEM FOR REMOTELY CONTROLLING TELEMATICS UNIT OF VEHICLE

(71) Applicant: HYUNDAI MOTOR COMPANY, Seoul (KR)

(72) Inventor: Chang Woo Chun, Anyang-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 328 days.

(21) Appl. No.: 14/562,186

(22) Filed: Dec. 5, 2014

(65) Prior Publication Data

US 2016/0075293 A1    Mar. 17, 2016

(30) Foreign Application Priority Data

Sep. 16, 2014  (KR) .......................... 10-2014-0122603

(51) Int. Cl.
*H04W 76/04* (2009.01)
*H04W 4/14* (2009.01)
*H04W 76/02* (2009.01)

(52) U.S. Cl.
CPC .......... *H04W 76/045* (2013.01); *H04W 4/14* (2013.01); *H04W 76/02* (2013.01)

(58) Field of Classification Search
CPC combination set(s) only.
See application file for complete search history.

(56) References Cited

U.S. PATENT DOCUMENTS

| 9,444,892 | B1* | 9/2016 | Amireddy | H04L 67/12 |
| 2005/0085221 | A1* | 4/2005 | Sumcad | B60R 25/257 455/415 |
| 2007/0093943 | A1* | 4/2007 | Nelson | B60R 25/2018 701/2 |
| 2007/0288102 | A1* | 12/2007 | Korzin | G06F 1/32 700/22 |
| 2008/0046135 | A1* | 2/2008 | Farrow | G07C 5/008 701/2 |
| 2011/0320015 | A1* | 12/2011 | Yun | G08C 17/00 700/19 |
| 2013/0151067 | A1* | 6/2013 | Lammers | B60C 23/008 701/36 |

(Continued)

FOREIGN PATENT DOCUMENTS

JP    2013-239969 A    11/2013
KR  10-2007-0074182 A    7/2007

(Continued)

*Primary Examiner* — Thomas G Black
*Assistant Examiner* — Ana Thomas
(74) *Attorney, Agent, or Firm* — McDermott Will & Emery LLP

(57) ABSTRACT

A method for remotely controlling a telematics unit (TMU) of a vehicle includes: receiving, by a telematics multimedia system (TMS) center, login information of a vehicle remote control application of a user terminal using a vehicle remote control service; transmitting, by the TMS center, a wake-up message for enabling the TMU of the vehicle to the TMU of the vehicle as soon as the login information is received; and transmitting, by the TMS center, a remote control signal for controlling the TMU of the vehicle to the TMU of the vehicle after the wake-up message is transmitted.

12 Claims, 5 Drawing Sheets

(56) References Cited

U.S. PATENT DOCUMENTS

| | | | |
|---|---|---|---|
| 2016/0075293 A1* | 3/2016 | Chun | H04W 76/045 |
| | | | 701/2 |
| 2016/0082952 A1* | 3/2016 | Kang | B60W 30/00 |
| | | | 701/2 |
| 2016/0096508 A1* | 4/2016 | Oz | H04L 67/125 |
| | | | 701/36 |
| 2016/0098670 A1* | 4/2016 | Oz | G06Q 30/0641 |
| | | | 705/27.1 |
| 2016/0099927 A1* | 4/2016 | Oz | H04L 63/08 |
| | | | 726/9 |
| 2016/0142888 A1* | 5/2016 | Moon | H04W 4/12 |
| | | | 455/414.1 |

FOREIGN PATENT DOCUMENTS

| | | |
|---|---|---|
| KR | 10-0843901 B1 | 7/2008 |
| KR | 10-2013-0066183 A | 6/2013 |
| KR | 10-1365454 B1 | 3/2014 |

\* cited by examiner

METHOD AND SYSTEM FOR REMOTELY CONTROLLING TELEMATICS UNIT OF VEHICLE

CROSS-REFERENCE TO RELATED APPLICATION

This application claims priority to and the benefit of Korean Patent Application No. 10-2014-0122603 filed in the Korean Intellectual Property Office on Sep. 16, 2014, the entire contents of which are incorporated herein by reference.

FIELD OF THE INVENTION

The present disclosure relates to a method and a system for remotely controlling a telematics unit (TMU) of a vehicle. More particularly, the present disclosure relates to a method and a system for remotely controlling the TMU of a vehicle capable of improving a remote control speed of the TMU of the vehicle.

BACKGROUND

A telematics technology is one of technologies that have been recently spotlighted. A vehicle telematics system is a system combining a mobile communication scheme and a position tracking scheme with the Internet to detect occurrence of a vehicle accident or occurrence of a vehicle theft, guide a vehicle driving route, and provide various other information, or the like, to a vehicle driver. That is, the vehicle telematics system is a system providing information through a vehicle based on a global positioning system (GPS) using mobile communication and a GPS satellite. Therefore, the vehicle telematics system can be expanded to providing various mobile communication services such as traffic information, a countermeasure against an emergency, remote vehicle diagnosis, use of the Internet (for example, financial transaction, provision of news, transmission and reception of e-mails, and the like), and the like, to the vehicle driver by using the GPS, a wireless communication network, and the Internet network.

One of the reasons why the telematics is significantly spotlighted is that a vehicle industry and an information communication industry are combined with each other to create a new concept added value service capable of maximizing a synergy effect.

For this reason, a telematics standardization group has been formed and has performed a standardization work for operations and functions of the respective components of the telematics system, a communication protocol between the respective components, and services through a communication network.

When the telematics service is realized, the vehicle is reconstructed as a third Internet space following an office and a home through wired and wireless communication networks and a broadcasting network and is liked to a home network, office automation, and the like, through a mobile communication network, a broadcasting network, and an intelligent terminal, such that a service used in the home and the office may be seamlessly provided in the vehicle.

In accordance with the spotlight of the telematics technology as described above and the development of the telematics system, a need exists for the development of various service contents that may satisfy demands of users.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a method and a system for remotely controlling a telematics unit (TMU) or a telematics device of a vehicle having advantages of improving a remote control speed of the TMU of the vehicle.

The present disclosure has also been made in an effort to provide a method and a system for remotely controlling a TMU of a vehicle having advantages of improving a remote control speed of the TMU of a vehicle and decreasing consumption of a battery of a vehicle.

An exemplary embodiment of the present invention provides a method for remotely controlling a telematics unit (TMU) of a vehicle, including: receiving, by a telematics multimedia system (TMS) center, login information of a vehicle remote control application of a user terminal using a vehicle remote control service; transmitting, by the TMS center, a wake-up message for enabling the TMU of the vehicle to the TMU of the vehicle as soon as the login information is received; and transmitting, by the TMS center, a remote control signal for controlling the TMU of the vehicle to the TMU of the vehicle after the wake-up message is transmitted.

The TMS center may classify use pattern information of the user terminal collected from an access to the TMS center by the user terminal or a user and transmit the wake-up message to the TMU of the vehicle based on the classified use pattern information.

The use pattern information may include information on types of services, position, and use time of the user terminal using the vehicle remote control service.

A method of classifying the use pattern information of the user terminal may be k-nearest neighbor (KNN) algorithms. The remote control service included in the use pattern information classified by the KNN algorithms may include a remote wake-up on service, a remote wake-up off service, a door lock service, a door unlock service, a horn and light operation service, a light operation service, and a parking position confirming service.

In the case in which the TMU of the vehicle enters a sleep state, the TMS center may again transmit the wake-up message for enabling the TMU of the vehicle.

Another exemplary embodiment of the present invention provides a method for remotely controlling a TMU of a vehicle, including: transmitting, by a TMS center, a wake-up message for enabling the TMU of the vehicle to the TMU of the vehicle based on use pattern information of a user terminal using a vehicle remote control service; receiving, by the TMS center, login information and authentication information of a vehicle remote control application of the user terminal after the wake-up message is transmitted to the TMU of the vehicle; and transmitting, by the TMS center, a remote control signal for controlling the TMU of the vehicle to the TMU of the vehicle after the login information and the authentication information are received.

The TMS center may classify use pattern information of the user terminal collected from an access to the TMS center by the user terminal or a user and transmit the wake-up message to the TMU of the vehicle based on the classified use pattern information.

The use pattern information may include information on types of services, position, and use time of the user terminal using the vehicle remote control service.

The use pattern information may be N high ranking pattern information frequently used among pattern information executing the vehicle remote control service. The TMS center and the TMU of the vehicle may maintain wireless communication therebetween during a wireless communication connection maintaining time having the highest likelihood among wireless communication connection maintaining times between the TMS center and the TMU of the vehicle executed by the N high ranking pattern information.

Yet another exemplary embodiment of the present invention provides a system for remotely controlling a TMU of a vehicle, including: a user terminal receiving login information; a TMS center transmitting a wake-up message when the TMS center receives the login information from the user terminal; and the TMU of the vehicle enabled in response to the wake-up message.

The TMS center may classify use pattern information of the user terminal collected from an access to the TMS center by the user terminal or a user and transmit the wake-up message to the TMU of the vehicle based on the classified use pattern information.

The use pattern information may include information on types of services, position, and use time of the user terminal using a vehicle remote control service.

As described above, with the method and the system for remotely controlling a TMU of a vehicle according to an exemplary embodiment of the present invention, since the wake-up message for waking up the TMU included in the vehicle may be transmitted in advance, a remote control speed for the TMU of the vehicle may be improved.

With the method and the system for remotely controlling a TMU of a vehicle according to the present invention, the use pattern information of the user (user terminal) such as position information and use time information of the user, which is a client using the vehicle remote control service, is used to decrease a time delay of the vehicle remote control service, thereby making it possible to efficiently provide the remote control service.

In addition, according to the present disclosure, a modification of a remote control service system of a vehicle or a remote control protocol of a vehicle is minimized, thereby making it possible to allow a vehicle remote control system to be developed.

BRIEF DESCRIPTION OF THE DRAWINGS

A brief description of the drawings will be provided in order to allow the drawings used in a detailed description of the present disclosure to be sufficiently understood.

DETAILED DESCRIPTION OF THE EMBODIMENTS

Figure 1:
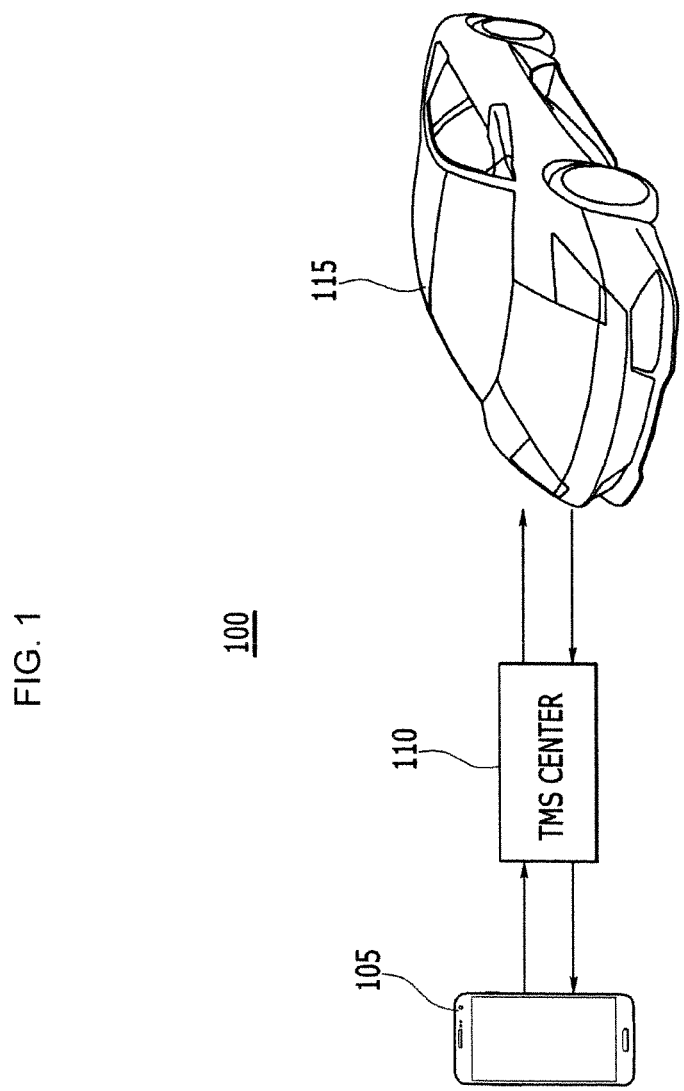
FIG. 1 is a diagram describing a system for remotely controlling a telematics unit of a vehicle according to an exemplary embodiment of the present invention.

In order to sufficiently understand the present disclosure and objects accomplished by executing the present disclosure, the accompanying drawings showing exemplary embodiments of the present invention and contents described in the accompanying drawings should be referred.

Hereinafter, the present disclosure will be described in detail by describing exemplary embodiments of the present invention with reference to the accompanying drawings. Further, in describing the present disclosure, well-known configurations and functions will not be described in detail since they may unnecessarily obscure the gist of the present disclosure. Throughout the accompanying drawings, the same reference numerals will be used to denote the same components.

Terms used in the present specification are used only in order to describe specific exemplary embodiments rather than limiting the present invention. Singular forms are to include plural forms unless the context clearly indicates otherwise. It will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Unless being defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

FIG. 1 is a diagram describing a system for remotely controlling a telematics unit of a vehicle according to an exemplary embodiment of the present invention.

Referring to FIG. 1, the system 100 for remotely controlling a telematics unit of a vehicle may include a user terminal 105, which is a client terminal, a telematics multimedia system (TMS) center 110, and a vehicle 115 including a telematics unit (not shown) (mounted therein).

The user terminal 105 may receive login information of a vehicle remote control service, the TMS center 110 may transmit a wake-up message when it receives the login information from the user terminal 105, and the telematics unit of the vehicle 115 may be enabled in response to the wake-up message.

In another exemplary embodiment of the present invention, the TMS center 110 may classify use pattern information of the user terminal 105 collected from an access to the TMS center 110 by the user terminal 105 or a user and transmit the wake-up message to the telematics unit of the vehicle 115 based on the classified use pattern information (previous use pattern information). The use pattern information may include information on type of services, position, and use time of the user terminal 105 using the vehicle remote control service.

The user terminal 105 may execute the remote control service for the vehicle 115 through execution of a vehicle remote control application by the user. In another exemplary embodiment of the present invention, when the remote control service for the vehicle 115 is executed, use pattern information (for example, information on the types of services, use time, and position) on the remote control service of the user terminal (user) may be transmitted to the TMS center 110 through a wireless communication network. The TMS center 110 may store and classify the use pattern information. The user terminal 105 may be, for example, a smart phone or a smart pad.

Wireless communication may be connected between the telematics unit of the vehicle 115 and the TMS center 110 simultaneously with execution of the vehicle remote control application by the user terminal 105. The telematics unit may also be used as the meaning of a TMU, which is a functional block performing wireless communication with the TMS center 110. When the wireless communication is connected, the wake-up message such as a wake-up short message service (SMS) message may be transmitted.

In detail, when the vehicle 115 is remotely controlled through the application of the user terminal 105, if a condition corresponding to the use pattern information of the user terminal 105 is satisfied, the TMS center 110 may transmit an early wake-up SMS message to the TMU of the vehicle 115 as soon as the user, which is a driver, logs in the application of the user terminal 105. In another exemplary embodiment of the present invention, when N patterns frequently used among the use pattern information are generated in the user terminal 105, the TMS center 110 may transmit a customized wake-up SMS message to the vehicle 115 in advance to perform a remote control. When the remote control is performed, a transmission control protocol (TCP) communication connection state, which is a wireless communication, may be maintained between the application of the user terminal 105, the TMS center 110, and the TMU of the vehicle 115.

When the execution of the remote control service is requested by the user terminal 105, the TMS center 110 may request the TMU of the vehicle 115 (remote vehicle) positioned at a remote place to connect communication and transmit information (signal) for the remote control service through a wireless network. The TMS center 110, which is a TMS service center, may also be referred to as a TMS server.

The TMU of the vehicle 115 may transmit vehicle state information and remote control execution result information to the TMS center 110 in response to the remote control signal (information) of the TMS center 110. The TMU may control, for example, remote wake-up on and off operations of the vehicle 115, door lock and door unlock operations (for example, operations of opening and closing a door of the vehicle), horn and light on and off operations (for example, a warning operation using a horn and a light), a light-only operation (for example, a warning operation using a light such as a headlamp of the vehicle), or a parking position confirming operation. The TMS center 110 may transfer the transmitted vehicle state information and remote control execution result information to the user terminal 105.

A telematics may indicate a technology of mounting a global positioning system (GPS) and a geographic information system (GIS) in the vehicle 115 to provide various mobile services such as traffic information, a countermeasure against an emergency, remote vehicle diagnosis, use of the Internet, and the like, to the driver and a passenger. A telematics apparatus may include input and output devices such as a microphone and a speaker for functions such as a speech recognition function, a text to speed (TTS) function, and the like, a liquid crystal display (LCD), a keyboard, and a touch screen.

The telematics technology, which is a technology of controlling the vehicle at a remote distance, may be a technology in which a TMU, which is a telematics terminal mounted in a vehicle, transmits position and state information of the vehicle to a server positioned at a remote place and a vehicle owner or a driver acquires the information by using his/her terminal via a server. In addition, the telematics technology may provide an environment in which a user may transmit a remote control command by using his/her terminal. The telematics technology may be used to prevent a theft of the vehicle, manage a rental car, or build-up a vehicle controlling system.

As described above, since the wake-up message may be transmitted in advance, a remote control speed of the TMU of the vehicle 115 may be improved. In addition, since the vehicle 115 may be remotely controlled by using the use pattern information on the remote control of the user terminal 105, a service time delay and consumption of a battery of the vehicle 115, which are disadvantages of the vehicle remote control service, may be decreased. That is, since the remote control service may be provided through analysis of the remote control use pattern of the user terminal 105, the remote control service may be efficiently provided by selecting an appropriate service.

Figure 2:
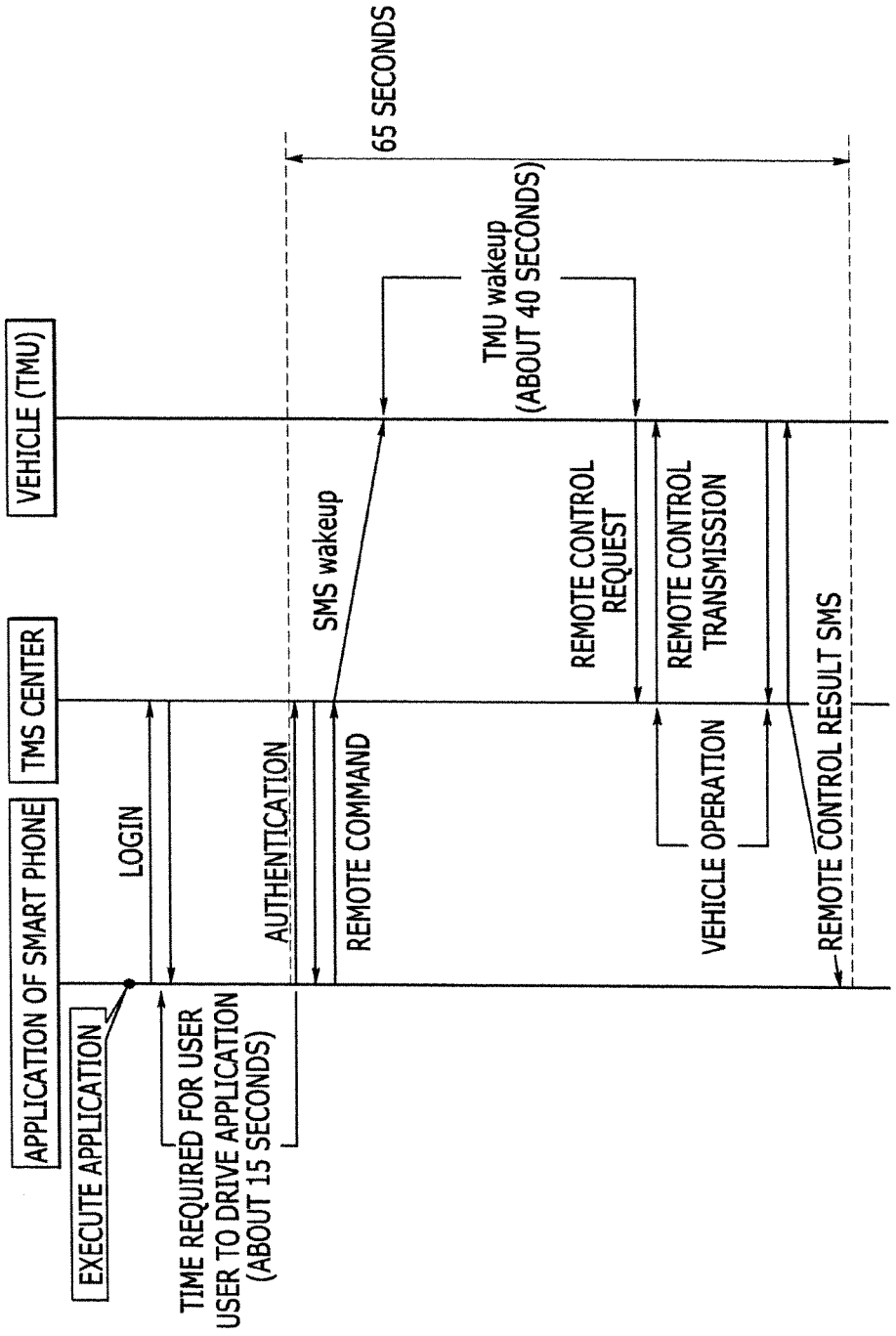
FIG. 2 is a diagram showing an example of a method for remotely controlling a telematics unit (TMU) of a vehicle.

FIG. 2 is a diagram showing an example of a method for remotely controlling a TMU of a vehicle. In the method for remotely controlling the TMU of a vehicle, an application of a smart phone transmits a remote command for remotely controlling the TMU of the vehicle to the TMU of the vehicle through the TMS center to thereby be connected to the TMU of the vehicle.

Referring to FIG. 2, the user of the smart phone executes the application installed (mounted) in the smart phone, such that a login process and an authentication process are performed between the smart phone and the TMS center. A time required for the user to drive the application from a start of the login process up to an end of the authentication process may be, for example, 15 seconds. The time, however, may vary, not limited to 15 seconds.

The application of the smart phone transmits the remote command to the TMS center after the authentication process. The TMS center transmits the SMS wake-up message for waking up the TMU of the vehicle to the TMU of the vehicle in response to the remote command.

The TMU of the vehicle performs a wake-up operation during a time of about 40 seconds in response to the wake-up message. The time for the wake-up operation is not limited to 40 seconds. The TMU of the vehicle ends the wake-up operation and then requests the TMS center to transmit a remote control signal corresponding to the remote command. In this case, the TMS center transmits the remote control signal to the TMU of the vehicle.

The TMU of the vehicle controls a device in the vehicle so that a specific operation corresponding to the remote control signal is performed in the vehicle. After the above-mentioned operation is ended, the TMU of the vehicle transmits an SMS message indicating remote control result information to the TMS center. Then, the TMS center transmits an acknowledge (ACK) message for the transmitted SMS message to the TMU of the vehicle and transmits the SMS message to the application of the smart phone. A time required for the smart phone to end the reception of the SMS message indicating the remote control result after the authentication process is ended (completed) may be about 65 seconds. The time, however, is not limited to 65 seconds.

In detail, a time required for remotely controlling the vehicle may be about 65 seconds, which are the sum of an SMS transmission delay time (10 seconds) between the TMS center and the TMU of the vehicle, a wake-up time (40 seconds) of the TMU, an operation time (10 seconds) of the vehicle, and an SMS transmission delay time (5 seconds) between the TMS center and the application of the smart phone.

Figure 3:
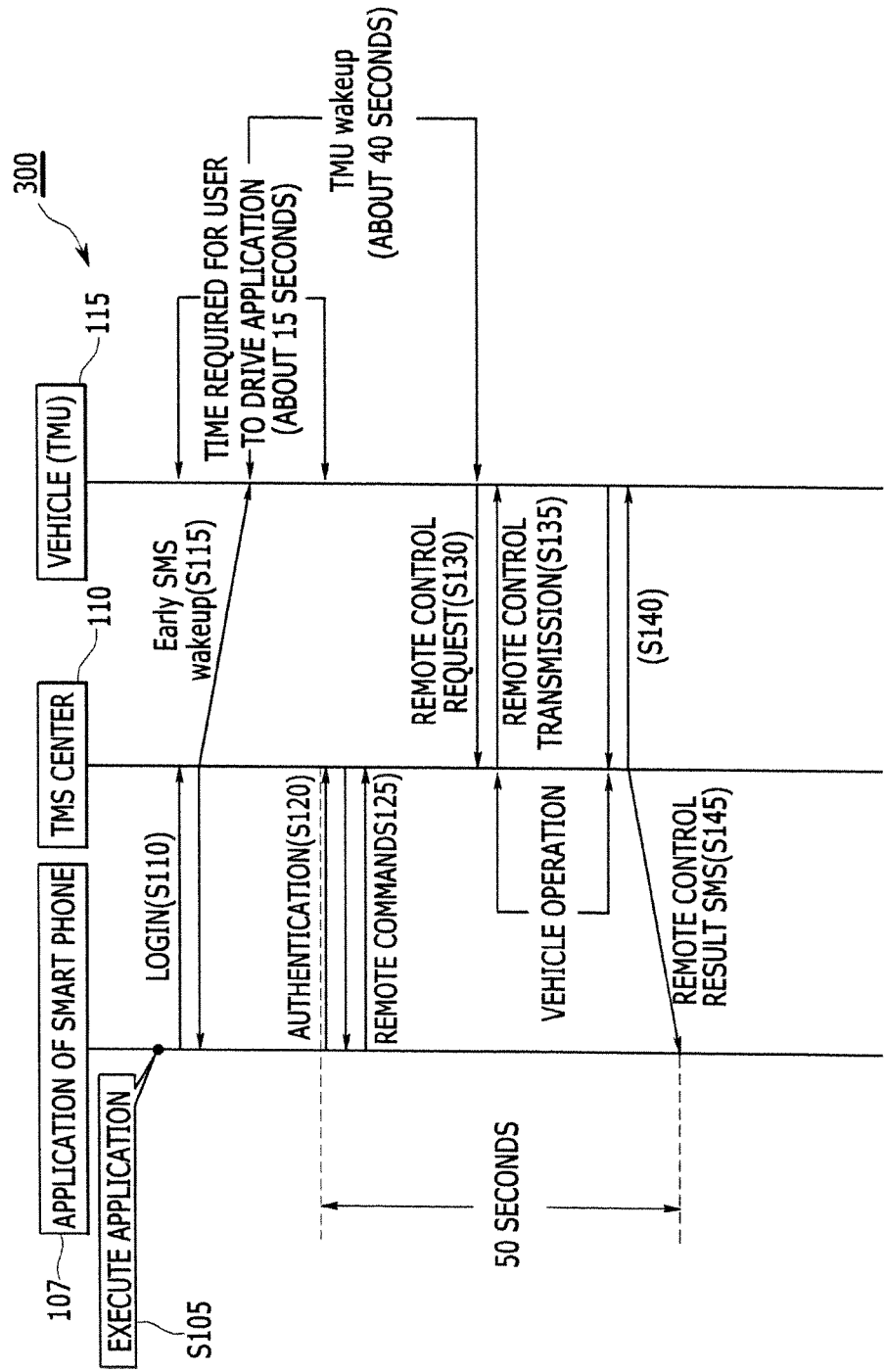
FIG. 3 is a flow chart describing a method for remotely controlling a telematics unit of a vehicle according to an exemplary embodiment of the present invention.

FIG. 3 is a diagram (signal flow chart) describing a method for remotely controlling a telematics unit of a vehicle according to an exemplary embodiment of the present invention. The method 300 for remotely controlling a telematics unit of a vehicle may be applied to the system 100 shown in FIG. 1.

Referring to FIG. 3 and FIG. 1, in the method 300 for remotely controlling a TMU of a vehicle, which may also be referred to as a communication connection time shortening process between the TMU of the vehicle 115 and the TMS center 110, a vehicle remote control application 107 of the user terminal 105 may be connected to the TMU of the vehicle 115 through the TMS center 110 as soon as it is executed. That is, a wake-up message such as an early wake-up SMS message may be used in order to connect between the TMS center 110 and the TMU of the vehicle 115 when the application 107 is executed.

The user may execute the vehicle remote control application 107 installed in the user terminal 105 such as the smart phone (S105). In this case, a login process between the application 107 of the smart phone and the TMS center 110 may be performed (S110). Then, the TMS center 110 may transmit a wake-up message such as an early wake-up SMS message for early waking up the TMU of the vehicle 115 to the TMU of the vehicle 115 (S115). The TMU of the vehicle 115 may perform a wake-up operation for about 40 seconds in response to the SMS wake-up message.

The application 107 of the smart phone may perform an authentication process (S120) after the login process is completed. A time required for the user to drive the application from a start of the login process up to an end of the authentication process may be, for example, 15 seconds. The time is not limited to 15 seconds.

The application 107 of the smart phone may transmit a remote command (remote control command) for remotely controlling the TMU of the vehicle 115 to the TMS center 110 (S125) after the authentication process.

In another exemplary embodiment of the present invention, when the remote command is not transmitted to the TMS center 110 during a wake-up operation time of the TMU of the vehicle 115, the TMS center 110 may transmit a wake-up message such as an SMS wake-up message for waking up the TMU of the vehicle to the TMU of the vehicle 115 in order to perform wireless communication with the TMU of the vehicle 115. The reason why the SMS wake-up message is transmitted is that the TMU of the vehicle may enter a sleep state when a predetermined time (for example, 40 seconds) elapses in order to prevent the battery of the vehicle 115 from being excessively used.

Since the TMU of the vehicle 115 is waken up in advance, it may request the TMS center 110 to transmit a remote control signal corresponding to the remote command (S130). In this case, the TMS center 110 may transmit the remote control signal to the TMU of the vehicle 115 (S135).

The TMU of the vehicle 115 may control a device in the vehicle so that a specific operation corresponding to the remote control signal is performed in the vehicle 115. After the above-mentioned operation is ended, when the TMU of the vehicle 115 transmits an SMS message indicating remote control result information to the TMS center 110, the TMS center 110 may transmit an ACK message for the transmitted SMS message to the TMU of the vehicle 115 (S140). Then, the TMS center 110 may transmit the SMS message to the application 107 of the smart phone (S145).

As described above, the TMS center 110 may receive the login information of the vehicle remote control application of the user terminal 105. The TMS center 110 may transmit a wake-up message (signal) for enabling the TMU of the vehicle 115 to the TMU of the vehicle 115 as soon as it receives the login information (when it receives the login information). In another exemplary embodiment of the present invention, in the case in which the TMU of the vehicle 115 enters the sleep state (that is, the TMS center 110 receives a remote command for controlling the TMU of the vehicle 115 from the user terminal 105 after the predetermined time elapses), the TMS center 110 may again transmit the wake-up message for enabling the TMU of the vehicle 115. After the TMS center 110 transmits the early wake-up SMS message, it may transmit (transfer) the remote control signal for controlling the TMU of the vehicle 115 to the TMU of the vehicle 115.

The sleep state (sleep mode) may be a state in which power of the TMU is turned off and a communication modem that may be included in the TMU is enabled in order to receive the SMS message, in order to decrease the consumption of the battery of the vehicle 115 after the wake-up of the vehicle 115 is turned off. The TMU may have three states, that is, an active state, the sleep state, and a disable state. The active state, which is a state in which the TMU may be used by receiving the wake-up SMS message in the sleep state, may indicate a state in which the TMS center 110 may perform TCP/IP data communication by recognizing an Internet protocol (IP) address of the TMU. The disable state may be a state in which the TMU may not be used. In the disable state, both of the TMU and the communication modem may be disabled in order to prevent the battery of the vehicle from being discharged in the case in which a predetermined time elapses after the wake-up of the vehicle 115 is turned off or a remaining amount of the battery of the vehicle drops to a reference amount or less. In order to again change the disable state into the active state, it is required to charge the battery or turn on the wake-up of the vehicle.

In another exemplary embodiment of the present invention, the TMS center 110 may classify use pattern information (previous use pattern information) of the user terminal 105 collected from an access to the TMS center 110 by the user terminal 105 or the user and transmit the wake-up message to the TMU of the vehicle 115 based on the classified use pattern information. The use pattern information may include information on the types of services, position, and use time of the user terminal 105 using the vehicle remote control service.

A method of classifying the use pattern information of the user terminal 105 may be k-nearest neighbor (KNN) algorithms. The remote control service included in the use pattern information classified by the KNN algorithms may include a remote wake-up on service, a remote wake-up off service, a door lock service, a door unlock service, a horn and light operation service, a light operation service, and a parking position confirming service.

As shown in FIG. 3, a control time required until the application 107 of the smart phone ends the reception of the SMS message indicating the remote control result information after the authentication process of the method according to the present disclosure described above is ended may be about 50 seconds, which is more rapid than the corresponding control time in the method shown in FIG. 2.

In detail, as soon as the user logs in the application, the early wake-up SMS message is transmitted to early perform the wake-up for the TMU of the vehicle 115, such that the entire remote control time may be shortened.

As a time consumed for the user to drive the application becomes long, the remote control time may be shortened. For example, in the case in which a time of 15 seconds is used for the user to drive the application, the remote control signal may be shortened by about 25% as compared with the method shown in FIG. 2. When the wake-up of the TMU of the vehicle 115 is completely made during a period in which the application 107 is driven, a time up to 40 seconds may be shortened. That is, the remote control may be completed within 25 seconds, and the remote control time of the present invention may be shortened by about 60% as compared with the method shown in FIG. 2. Therefore, with the present disclosure, the remote control speed for the TMU included in the vehicle may be improved.

Another example of the method 300 for remotely controlling a telematics unit of a vehicle for implementing an efficient vehicle remote control service will be described below. In another example, the use pattern information of the user terminal 105 such as the service kind information, the position information, and the use time information of the user terminal 105 using the vehicle remote control service may be used. That is, in another example, a method of extracting and learning or training the use pattern information of the user terminal 105 may be included.

The method 300 for remotely controlling a telematics unit of a vehicle shown in FIG. 3 may be a method allowing TPC communication to be connected as soon as possible by transmitting the wake-up SMS message in advance in order to shorten a booting (or loading) time of the TMU of the vehicle 115.

However, in the case in which the user of the user terminal 105 executes the application 107 and does not use the remote control service, an unnecessary wake-up of the TMU of the vehicle 115 is generated, such that the battery of the vehicle 115 may be consumed. That is, in the case in which the remote control request by the application of the user terminal 105 is not present although the user executes the application to wake up the TMU of the vehicle 115 and then perform the connection of the TCP communication, unnecessary consumption of data may be generated during a time in which the connection between the TMS center 110 and the TMU of the vehicle 115 is maintained.

In order to solve the above-mentioned problem, in another exemplary embodiment of the present invention, a statistical methodology is applied to the use pattern data (use pattern information) of the user terminal 105 to extract and learn meaningful information, thereby making it possible to decrease the number of unnecessary wake-ups of the TMU of the vehicle 105 and decrease the consumption of the battery of the vehicle 115.

The user of the user terminal 105 of which the use pattern information is not present may set use pattern information of an early wake-up condition of the TMU of the vehicle in the TMS center 100 through the user terminal 105 or a web page of the TMS center 110. The use pattern information of the early wake-up condition may be, for example, a kind of service to which the method 300 for remotely controlling a telematics unit of a vehicle of FIG. 3 is to be applied (in which the early wake-up SMS message is to be used), a date, a time (or a time zone), a position (position information of the user terminal 105), and the like. The user terminal 105 includes, for example, a GPS receiver, thereby making it possible to recognize the position information of the user terminal 105.

For example, in the case in which the user set the use pattern information to (remote wakeup and conditioning, August, 7:30, around house), when the remote control application 107 of the smart phone is executed at about 7:30 in August, the early wake-up SMS message may be transmitted from the TMS center 110 to the TMU of the vehicle as soon as the application is logged in.

In the case in which the use pattern information is not set, the TMU of the vehicle receiving the wake-up SMS message as soon as the application 107 is logged in may be waken up and then maintained in a booted state for, for example, three minutes, which is a default setting value, and may be changed into a sleep mode in the case in which the remote control request from the application 107 is not present. In detail, in the case in which a state of the TMU is changed from the sleep state into the active state for receiving the remote command by the wake-up SMS message, the TMU may be maintained in the wake-up state for three minutes. A time required for booting the TMU from the sleep state to the active state may be, for example, 40 seconds or more to 60 seconds or less.

The remote control application 107 may store the use pattern information (use pattern data). The use pattern information may include remote control speed improvement setting information, an application login date, an application login time, position information of the user terminal 105 at the time of logging in the application, information on whether or not the early wake-up SMS message is transmitted at the time of executing the application, and remote control service use information after logging in the application (a date, a time, a position, a time in which the early wake-up SMS message is sent, and information on whether or not the service succeeds).

A remote control service mainly used by the user and information on a specific environment in which the remote control service is used may be classified by clustering algorithms such as k-nearest neighbor (KNN) algorithms from the use pattern information. When a specific environment condition is satisfied, the method 300 for remotely controlling a telematics unit of a vehicle is performed, such that the early wake-up SMS message may be used. That is, the TMS center 110 may classify the use pattern information (use pattern data) collected from the application 107 of the user terminal by using the KNN algorithms and transmit the early wake-up message to the TMU of the vehicle 115 in a specific service use pattern state.

The TMS center 110 may apply the KNN algorithms to execute the classification of the use pattern data in the case in which an amount of use pattern data collected from the user terminal 105 is K or more. The number of classes classified into K may be a total number of remote control services. In the case in which K=7, the remote control service may include, for example, a remote wake-up on service, a remote wake-up off service, a door lock service, a door unlock service, a horn and light operation service, a light only operation service, and a parking position confirming service.

The TMS center 110 may cluster the use pattern information by applying the KNN algorithms from the use pattern data built-up in four dimensions (date, time, latitude, and longitude).

The KNN algorithms may primarily cluster the use pattern data labeled to a remote control service kind and calculate a distance between each point corresponding to the use pattern data and the center of each cluster to again cluster the use pattern data to a closer side. The distance may be calculated by using the Euclidean distance function.

The above-mentioned process may be repeated until the clustering of the use pattern data is completed. That is, a frequently used remote control service may be allocated to each cluster. Since each cluster includes a use pattern information region of the user, in the case in which the application 107 is executed in the corresponding region, the TMS center 110 may send the early wake-up SMS message at the time of executing the application.

Figure 4:
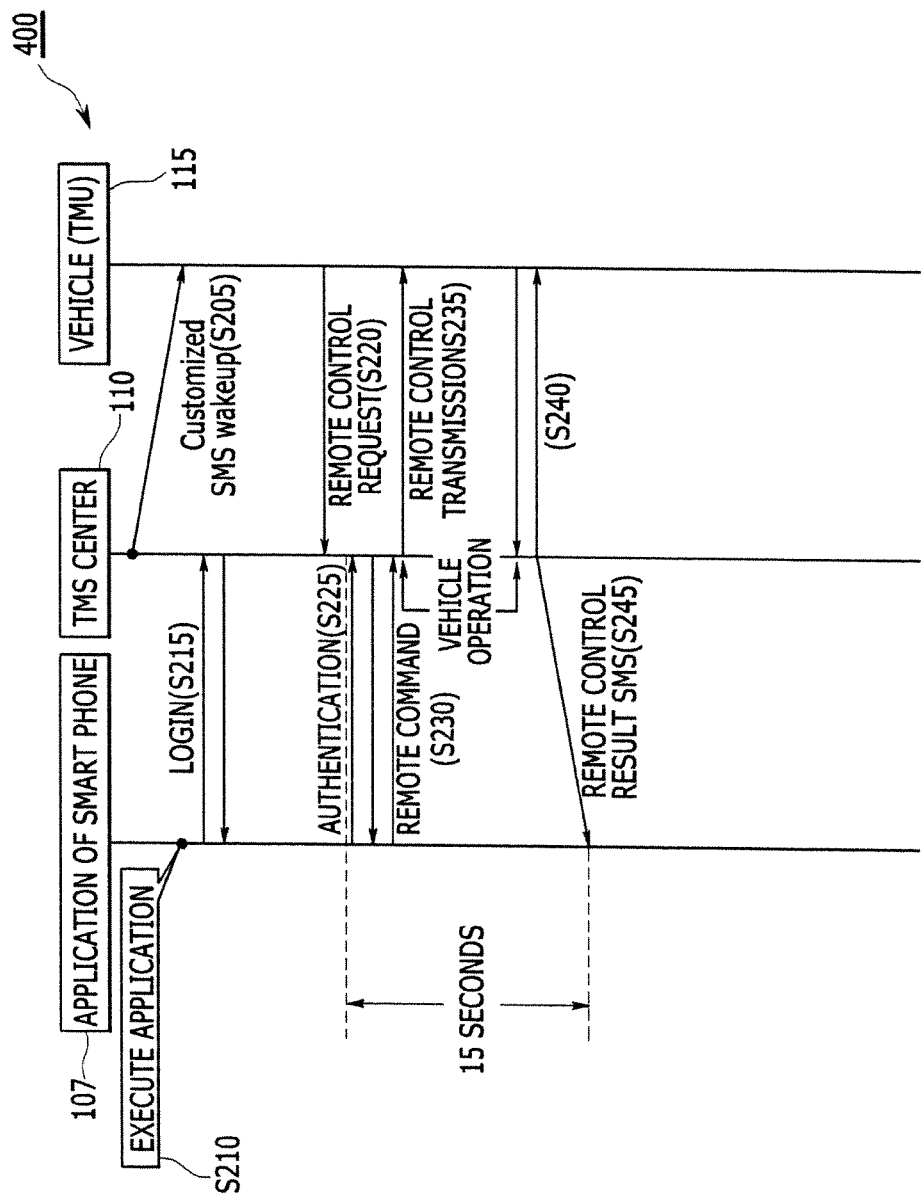
FIG. 4 is a diagram describing a method for remotely controlling a telematics unit of a vehicle according to another exemplary embodiment of the present invention.

FIG. 4 is a diagram describing a method for remotely controlling a telematics unit of a vehicle according to another exemplary embodiment of the present invention. The method 400 for remotely controlling a telematics unit of a vehicle may be applied to the system 100 shown in FIG. 1.

Referring to FIG. 4 and FIG. 1, the method 400 for remotely controlling a telematics unit of a vehicle may be a process of first connecting communication between the TMS center 110 and the TMU of the vehicle 115 to early wake up the TMU of the vehicle 115. Although the TMS center 110 has been denoted by the same reference numeral as that of the TMS center 110 shown in FIG. 3, the TMS center 110 of FIG. 4 may perform an operation (function) different from that of the TMS center 110 of FIG. 3.

The TMS center 110 may transmit a wake-up message such as a customized wake-up SMS message for waking up the TMU of the vehicle 115 to the TMU of the vehicle 115 based on the use pattern information of the user terminal 105 using the vehicle remote control service (S205). The TMU of the vehicle 115 may perform a wake-up operation for about 40 seconds in response to the SMS wake-up message.

In detail, the TMS center 110 may transmit the customized wake-up SMS message to the TMU of the vehicle 115 by using the use pattern information of the user using the remote control before the application 107 of the smart phone is executed by the user. The TMU of the vehicle 115 may be enabled in response to the transmitted customized wake-up SMS message, such that a modem that may be included in the TMU of the vehicle 115 may be maintained in a state in which it is periodically connected to a network (TMS center 110). Therefore, as soon as the user of the user terminal 105 gives a remote command, the TMS center 110 transmits the remote control signal to the TMU of the vehicle, such that the vehicle may be immediately operated.

After the TMS center 110 transmits the customized wake-up SMS message to the TMU of the vehicle 115, the user may execute the vehicle remote control application 107 installed in the user terminal 105 such as a smart phone (S210). Then, a login process between the application 107 of the smart phone and the TMS center 110 may be performed (S215).

Since the TMU of the vehicle 115 is waken up in advance, it may request the TMS center 110 to transmit a remote control signal corresponding to the remote command for remotely controlling the TMU of the vehicle 115 (S220).

After the TMU of the vehicle 115 requests the TMS center 110 to transmit the remote control signal, the application 107 of the smart phone may perform an authentication process (S225). A time required for the user to drive the application from a start of the login process up to an end of the authentication process may be, for example, about 15 seconds. The time is not limited to, the one example, 15 seconds.

The application 107 of the smart phone may transmit a remote command (remote control command) for remotely controlling the TMU of the vehicle 115 to the TMS center 110 (S230) after the authentication process. The TMS center 110 may transmit the remote control signal corresponding to the remote command to the TMU of the vehicle 115 (S235).

In another exemplary embodiment of the present invention, when the remote command is not transmitted to the TMS center 110 during a wake-up operation time of the TMU of the vehicle 115, the TMS center 110 may transmit a wake-up message such as an SMS wake-up message for waking up the TMU of the vehicle to the TMU of the vehicle 115 in order to perform wireless communication with the TMU of the vehicle 115. The reason why the SMS wake-up message is transmitted is that the TMU of the vehicle may enter a sleep state when a predetermined time (for example, 40 seconds) elapses in order to prevent the battery of the vehicle 115 from being excessively used.

The TMU of the vehicle 115 may control a device in the vehicle so that a specific operation corresponding to the remote control signal is performed in the vehicle 115. After the above-mentioned operation ends, when the TMU of the vehicle 115 transmits an SMS message indicating remote control result information to the TMS center 110, the TMS center 110 may transmit an ACK message for the transmitted SMS message to the TMU of the vehicle 115 (S240). Then, the TMS center 110 may transmit the SMS message to the application 107 of the smart phone (S245).

In the method 400 for remotely controlling a telematics unit of a vehicle, an SMS message transmission delay time (10 seconds) between the TMS center 110 and the TMU of the vehicle 115 and a wake-up time (40 seconds) of the TMU of the vehicle 115, which correspond to large parts of a time required for remotely controlling the vehicle, may be disposed before the authentication process of the application 107 of the smart phone, as shown in FIG. 4. Therefore, the remote control operation of the present invention may be possible at a total of 15 seconds, which is the sum of a vehicle operation time (10 seconds) and an SMS message delay time (5 seconds) between the TMS center 110 an the application 107 of the smart phone. Therefore, the remote control time may be shortened by about 70% as compared with the method shown in FIG. 2.

As described above, the TMS center 110 may transmit a wake-up message for enabling the TMU of the vehicle 115 to the TMU of the vehicle 115 based on the use pattern information of the user terminal 105 using the vehicle remote control service. After the TMS center 110 transmits the wake-up message to the TMU of the vehicle 115, it may receive login information and authentication information of the vehicle remote control application of the user terminal 105. After the TMS terminal 110 receives the login information and the authentication information, it may transmit (transfer) the remote control signal for controlling the TMU of the vehicle 115 to the TMU of the vehicle 115.

The TMS center 110 may classify the use pattern information of the user terminal 105 collected from an access to the TMS center 110 by the user terminal 105 or the user and transmit the wake-up message to the TMU of the vehicle 115 based on the classified use pattern information. The use pattern information may include information on the types of services, position, and use time of the user terminal 105 using the vehicle remote control service. The use pattern information may be N high ranking pattern information frequently used among pattern information executing the vehicle remote control service. Here, N may be, for example, 7.

The TMS center 110 and the TMU of the vehicle 115 may maintain wireless communication therebetween during a wireless communication connection maintaining time having the highest likelihood among wireless communication connection maintaining times between the TMS center 110 and the TMU of the vehicle 115 executed by the N high ranking pattern information.

As a method of building up the use pattern information used in the method 400 for remotely controlling a telematics unit of a vehicle, a method of building up the use pattern information mentioned in a description for FIG. 3 may be used.

The method 400 for remotely controlling the TMU of a vehicle shown in FIG. 4 may allow TPC communication to be connected as soon as possible by transmitting the wake-up SMS message in advance in order to shorten a booting (or loading) time of the TMU of the vehicle 115. In addition, in the method 400 for remotely controlling a telematics unit of a vehicle, the TCP communication between the TMS center 110 and the TMU of the vehicle 115 may be maintained during only the best TCP connection maintaining time between the TMS center 110 and the TMU of the vehicle 115 extracted from the use pattern information of the user terminal 105. Therefore, in the case in which the remote control request by the application of the user terminal 105 is not present although the user executes the application 107 to perform the connection of the TCP communication after the TMU of the vehicle 115 is waken up, in the method 400 for remotely controlling a telematics unit of a vehicle, generation of unnecessary consumption of data may be prevented during a time in which the connection between the TMS center 110 and the TMU of the vehicle 115 is maintained.

In the method 400 for remotely controlling a telematics unit of a vehicle, a N-best selection method and a maximum likelihood method may be used in order to optimize the TCP connection maintaining time between the TMS center 110 and the TMU of the vehicle.

The N-best selection method, which is a ranking method, may be a method of selecting the N high ranking patterns frequently used among the remote control use patterns classified into K and first connecting between the TMS center 110 and the TMU of the vehicle by using the selected N high ranking patterns to transmit the customized wakeup SMS message.

The maximum likelihood method, which is a statistics probability method corresponding to a parameter estimation method used in statistics, may be a method of probabilistically inferring the next action of a customer from an action (use pattern information) taken by the customer to calculate a TCP connection maintaining time having the highest likelihood.

The N-best selection method may be applied to a process of first connecting between the TMS center 110 and the TMU of the vehicle by using the N high ranking patterns frequently used among already learned use pattern information.

The N-best selection method may transmit use frequency data and the customized wake-up SMS message from the already learned use pattern information and then analyze data on whether or not the remote control is actually executed.

In the N-best selection method, after the TMU of the vehicle is early waken up, the frequently used N high ranking patterns may be selected among the patterns in which the remote control service is executed before the TMU of the vehicle is again changed into the sleep mode. Here, N may be, for example, 7. The N high ranking pattern information may be stored in the TMS center 110.

In the case in which an environment corresponding to the stored pattern is satisfied, the TMS center 110 may send the customized wake-up SMS message for first connecting between the TMS center 110 and the TMU of the vehicle.

In the maximum likelihood method, a customized wake-up SMS message transmission time zone (TCP connection maintaining timeout) may be determined so as to maintain TPC connection in a time zone in which it is most likely that the customer will use the service by using a use time of the remote control service executed after the customized wake-up SMS message within the already learned pattern information is transmitted or data on an additional use time of the remote control service. In the maximum likelihood method, a TCP connection maintaining time between the TMU of the vehicle 115 and the TMS center 110 after the TMU of the vehicle is waken up or a timeout limit in which the TCP connection is released (ended) and the TMU of the vehicle again returns to the sleep mode may be learned (extracted) from the use pattern information of the user terminal 105.

In the maximum likelihood method, a tuple including a customized wake-up SMS message transmitting (sending) time, a remote control service use time, and success of the service may be configured with respect to data corresponding to the use patterns selected by the N-best selection method among remote control service execution data. In the case in which only the customized wake-up SMS message, which is the early wake-up message, is sent and the remote control service is not actually used, a tuple including a customized wake-up SMS message transmitting time, a remote control service use time, and failure of the service may be configured by using a remote control service use time that is the closest to a time in which the remote control service is not used.

A default transmission time (TCP connection maintaining time) of the customized wake-up SMS message is set to θ, and a new default transmission time $\hat{\theta}$ that may decrease a failure rate (error rate) as compared with a current default transmission time may be calculated by the following [equation].

$$D_\theta = (X_1, X_2, \ldots, X_n)$$
$$\mathcal{L}(\theta) = f_\theta(x_1, x_2, \ldots, x_n)$$
$$\hat{\theta} = \underset{\theta}{\mathrm{argmax}}\ \mathcal{L}(\theta)$$

[equation]

In the above [equation], $X_1, X_2, \ldots, X_n$ may indicate tuple data, which are use pattern information including θ corresponding to a TCP connection maintaining time, $f\theta$ may indicate a probability density function, argmax may indicate a function for finding the TCP connection maintaining time θ allowing a likelihood function $\mathcal{L}(\theta)$ to have a maximum value.

In the above [equation], in the case in which the TCP connection maintaining time $\hat{\theta}$ allowing $\mathcal{L}(\theta)$ to have the maximum value may not be found, a current default transmission time, which is a fixed value, may be used as the TCP connection maintaining time θ. The N-best selection method and the maximum likelihood method described above may also be applied to the method 300 for remotely controlling a telematics unit of a vehicle described with reference to FIG. 3.

As described above, with the present disclosure, when the vehicle remote control application is executed, the operation of the vehicle may be more rapidly controlled remotely, and the vehicle remote control service is performed by using the use pattern information of the customer, such that the consumption of the battery of the vehicle may be decreased. With the present disclosure, a low speed, which is a disadvantage of the remote control service frequently used in a telematics vehicle, is improved, such that a remote control service speed may be improved, and a customized service may be provided.

Figure 5:
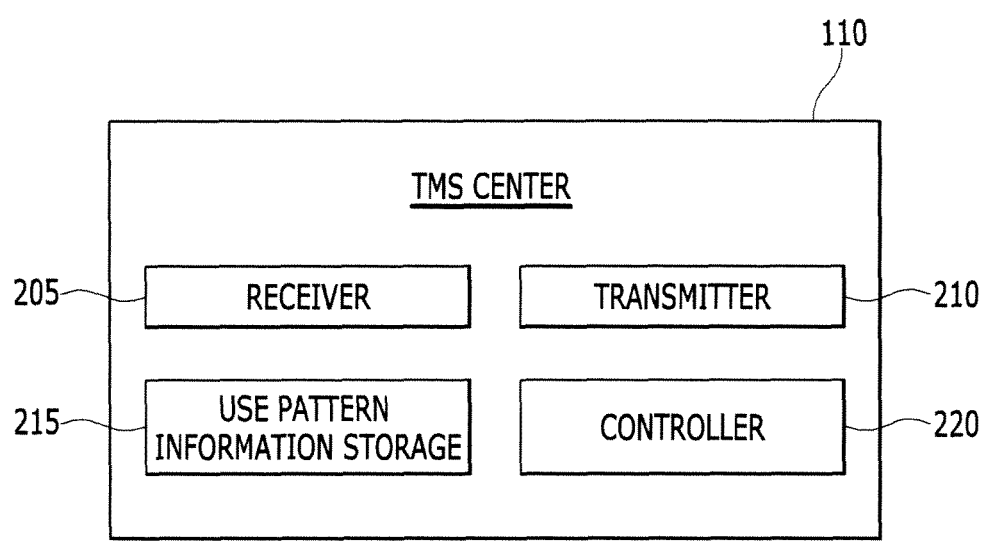
FIG. 5 is a block diagram describing an example of a TMS center shown in FIG. 3 or FIG. 4.

FIG. 5 is a block diagram describing an example of a TMS center shown in FIG. 3 or FIG. 4.

Referring to FIG. 5, FIG. 1, and FIGS. 3 and 4, the TMS center 110 may include a receiver 205, a transmitter 210, a use pattern storage (or use pattern information storage) 215, and a controller 220.

The receiver 205 may receive the login information of the vehicle remote control application of the user terminal 105 using the vehicle remote control service through a wireless network.

The transmitter 210 may transmit (send) the wake-up message for enabling the TMU of the vehicle 115 to the TMU of the vehicle 115 through the wireless network when the receiver 205 receives the login information. After the transmitter 210 transmits the wake-up message, it may transmit the remote control signal for controlling the TMU of the vehicle 115 to the TMU of the vehicle 115 through the wireless network. In another exemplary embodiment of the present invention, when the controller 220 receives the remote command for controlling the TMU of the vehicle 115 from the user terminal 105 through the receiver 205 after a predetermined time (for example, 40 seconds), which is a wake-up operation time of the TMU of the vehicle 115 by the wake-up message, elapses, the controller 220 may perform a control to again transmit the wake-up message for enabling the TMU of the vehicle 115 through the transmitter 210. In detail, in the case in which the TMU of the vehicle 115 enters the sleep mode, (that is, when the controller 220 receives the remote command for controlling the TMU of the vehicle 115 after the predetermined time elapses), the controller 220 may perform a control to again transmit the wake-up message for enabling the TMU of the vehicle 115.

In another exemplary embodiment of the present invention, the controller 220 may perform a control to classify the use pattern information (previous use pattern information) of the user terminal 105 collected from an access to the receiver 205 by the user terminal 105 or the user and store the classified use pattern information in the use pattern storage 215. The use pattern information may include service kind information, position information, and use time information of the user terminal 105 using the vehicle remote control service.

A method of classifying the use pattern information of the user terminal may be, for example, k-nearest neighbor (KNN) algorithms. The remote control service included in the use pattern information classified by the KNN algorithms may include a remote wake-up on service, a remote wake-up off service, a door lock service, a door unlock service, a horn and light operation service, a light operation service, and a parking position confirming service.

The controller 220 may perform a control to transmit the wake-up message to the TMU of the vehicle 115 through the transmitter 210 based on the use pattern information stored in the use pattern storage 215.

In another exemplary embodiment of the present invention, the controller 220 may perform a control to transmit the wake-up message for enabling the TMU of the vehicle 115 to the TMU of the vehicle 115 through the transmitter 210 based on the use pattern information of the user terminal 105 using the vehicle remote control service, may perform a control to receive the login information and the authentication information of the vehicle remote control application of the user terminal 105 through the receiver 205 after the wake-up message is transmitted to the TMU of the vehicle 115, and may perform a control to transmit the remote control signal for controlling the TMU of the vehicle 115 to the TMU of the vehicle 115 through the transmitter 210 after the login information and the authentication information are received.

The use pattern information may be N high ranking pattern information frequently used among pattern information executing the vehicle remote control service. Wireless communication between the TMS center 110 and the TMU of the vehicle 115 may be maintained during a wireless communication connection maintaining time having the highest likelihood among wireless communication connection maintaining times between the TMS center 110 and the TMU of the vehicle 115 executed by the N high ranking pattern information. The wireless communication connection maintaining time having the highest likelihood may be found by applying the maximum likelihood method to the use pattern information and may be, for example, a wireless communication connection maintaining time that is the most frequently used.

The controller 220 may perform a function of a central processing unit (CPU) and control general operations of the receiver 205, the transmitter 210, and the use pattern storage 215.

Components, "~units", blocks, or modules used in the present exemplary embodiment may be implemented by software such as tasks, classes, sub-routines, processes, objects, execution threads, or programs performed in a predetermined region on a memory or hardware such as a field programmable gate array (FPGA) or an application-specific integrated circuit (ASIC) and may be implemented by a combination of the software and the hardware. The components, the "~unit", or the like, may be included in a computer readable storage medium or may be dispersed and distributed in a plurality of computers.

Hereinabove, exemplary embodiments have been disclosed in the accompanying drawings and the specification. In the present specification, although specific terms have been used, they are used only in order to describe the present disclosure and are not used in order to limit the meaning or the scope of the present disclosure, which is disclosed in the claims. Therefore, those skilled in the art will understand that various modifications and equivalent exemplary embodiments are possible from the present disclosure. Therefore, an actual technical protection scope of the present invention is to be defined by the claims.

What is claimed is:

1. A method for remotely controlling a telematics unit (TMU) of a vehicle, comprising:
   receiving, by a telematics multimedia system (TMS) center, login information of a vehicle remote control application of a user terminal using a vehicle remote control service;
   transmitting, by the TMS center, to the TMU of the vehicle, a wake-up message for enabling the TMU of the vehicle when the login information is received; and
   transmitting, by the TMS center, to the TMU of the vehicle, a remote control signal for controlling the TMU of the vehicle after the wake-up message is transmitted,
   wherein the TMS center classifies use pattern information of the user terminal collected from an access to the TMS center by the user terminal or a user and transmits the wake-up message to the TMU of the vehicle based on the classified use pattern information.

2. The method of claim 1, wherein the use pattern information includes information on types of services, position, and use time of the user terminal using the vehicle remote control service.

3. The method of claim 2, wherein the classifying of the use pattern information of the user terminal is executed with k-nearest neighbor (KNN) algorithms.

4. The method of claim 3, wherein the remote control service included in the use pattern information classified by the KNN algorithms includes a remote wake-up on service, a remote wake-up off service, a door lock service, a door unlock service, a horn and light operation service, a light operation service, and a parking position confirming service.

5. The method of claim 1, wherein in the case in which the TMU of the vehicle enters a sleep state, the TMS center again transmits the wake-up message for enabling the TMU of the vehicle.

6. A method for remotely controlling a TMU of a vehicle, comprising:
   transmitting, by a TMS center, to the TMU of the vehicle, a wake-up message for enabling the TMU of the vehicle based on use pattern information of a user terminal using a vehicle remote control service;
   receiving, by the TMS center, login information and authentication information of a vehicle remote control application of the user terminal after the wake-up message is transmitted to the TMU of the vehicle; and
   transmitting, by the TMS center, to the TMU of the vehicle, a remote control signal for controlling the TMU of the vehicle after the login information and the authentication information are received,
   wherein the TMS center classifies use pattern information of the user terminal collected from an access to the TMS center by the user terminal or a user and transmits the wake-up message to the TMU of the vehicle based on the classified use pattern information.

7. The method of claim 6, wherein the use pattern information includes information on types of services, position, and use time of the user terminal using the vehicle remote control service.

8. The method of claim 7, wherein the use pattern information is N high ranking pattern information frequently used among pattern information executing the vehicle remote control service.

9. The method of claim 8, wherein the TMS center and the TMU of the vehicle maintain wireless communication therebetween during a wireless communication connection maintaining time having the highest likelihood among wireless communication connection maintaining times between the TMS center and the TMU of the vehicle executed by the N high ranking pattern information.

10. A system for remotely controlling a TMU of a vehicle, comprising:
    a user terminal receiving login information;
    a TMS center transmitting a wake-up message when the TMS center receives the login information from the user terminal; and
    the TMU of the vehicle enabled in response to the wake-up message,
    wherein the TMS center classifies use pattern information of the user terminal collected from an access to the TMS center by the user terminal or a user and transmits the wake-up message to the TMU of the vehicle based on the classified use pattern information.

11. The system of claim 10, wherein the use pattern information includes information on types of services, position, and use time of the user terminal using a vehicle remote control service.

12. A non-transitory computer readable medium including instructions, execution of which causes a processor to perform the method of claim 6.

* * * * *